United States Patent

Hoyer et al.

[11] 3,856,773
[45] Dec. 24, 1974

[54] WATER INSOLUBLE 4-(2'-CYANO-4'-NITROPHENYLAZO)-2-CHLORO-N-(B-CYANOETHYL)-ANILINE

[75] Inventors: Ernst Hoyer; Hans Jakob Schladetsch, both of Frankfurt am Main, Germany

[73] Assignee: Farbwerke Hoechst Aktiengesellschaft vormals Meister Lucius & Bruning, Frankfurt am Main, Germany

[22] Filed: July 25, 1972

[21] Appl. No.: 274,837

[30] Foreign Application Priority Data
July 27, 1971 Germany............................ 2137500

[52] U.S. Cl. ................................................ 260/205
[51] Int. Cl............................................., C09b 29/08
[58] Field of Search ..................................... 260/205

[56] References Cited
UNITED STATES PATENTS
2,941,992 6/1960 Rhyner et al. ...................... 260/205
3,081,295 3/1963 Sterling............................... 260/205

Primary Examiner—Lorraine A. Weinberger
Assistant Examiner—C. F. Warren
Attorney, Agent, or Firm—Curtis, Morris & Safford

[57] ABSTRACT

The water-insoluble azo-dyestuff of the formula

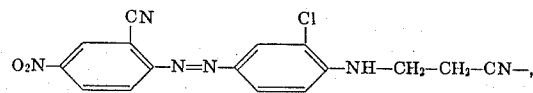

said dyestuff being suitable for the dyeing of fibrous materials consisting of polyesters, the clear, heavy and reddish orange dyeings obtained on said materials being distinguished by very good fastness properties to ironing, to wet processing, to waste gas and to light.

1 Claim, No Drawings

WATER INSOLUBLE 4-(2'-CYANO-4'-NITROPHENYLAZO)-2-CHLORO-N-(B-CYANOETHYL)-ANILINE

The present invention relates to the new, water-insoluble monoazo dyestuff of the formula

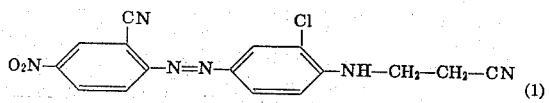

and to a process for preparing it wherein the diazo component 2-cyano-4-nitro-aniline of the formula

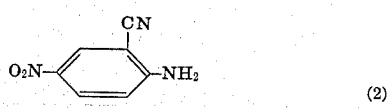

is diazotized and coupled with the coupling component N-(β-cyano-ethyl)-2-chloro-aniline of the formula

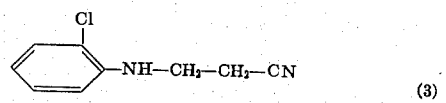

The new dyestuff is prepared in known manner by diazotizing 2-cyano-4-nitro-aniline, for example in sulfuric acid with nitrosyl sulfuric acid, and by coupling the diazonium salt obtained with N-(β-cyano-ethyl)-2-chloro-aniline. Coupling is effected in a strongly to slightly acidic medium, preferably in mineral acid, in an aqueous or aqueous-organic medium, corresponding to a pH value of about 0 to about 5. The dyestuff is practically insoluble in water and is separated as crystals. In the cases in which the dyestuff formed is partly dissolved in the coupling medium, for example if coupling is performed in the presence of organic solvents such as acetic and/or propionic acid, the dyestuff is precipitated by addition of water and/or the pH value is increased by adding for example buffer salts, as for example sodium acetate or other additives reducing the concentration of hydrogen ions. The dyestuff precipitated is isolated by suction-filtering, washing neutral with water on the suction-filter and washing free from electrolytes and drying.

The coupling component of the mentioned formula (3) used according to the present process may be obtained by reacting 2-chloro-aniline with acrylonitrile in the presence of copper acetate at the boiling temperature of the acrylonitrile as directed in Organic Syntheses (Coll. Vol. IV, 146). With regard to the yield which may be obtained, it is more advantageous to cyanoethylate 2-chloroformanilide according to the instructions of German Offenlegungsschrift No. 1,963,010 and to hydrolyse in an acidic medium the composition obtained.

The new dyestuff is suitable, preferably in a prepared state, for example as aqueous dispersion or solution in organic solvents or as emulsion or dispersion, which may contain water besides a solvent or a mixture of solvents, for dyeing and printing synthetic fibrous materials. As suitable fibrous materials there may be mentioned for example: Cellulose-di-, 2 ½ and -triacetate fibrous materials; polyamides such as poly-ε-caprolactame or polyhexamethylene diaminadipate; polyurethane; polyolefins, polycarbonates; especially fibrous materials made of polyesters such as polyethylene glycol terephthalate fibres.

The dyeing of the mentioned fibrous materials with the new dyestuff from an aqueous dispersion is preferably effected at temperatures above 100°C under pressure. Dyeing may also be performed at the boiling point of the water in the presence of carriers such as phenylphenols, polychlorobenzene compounds or comparable auxiliaries. Intense dyeings are also obtained, when impregnating knitted or woven fabrics of polyester fibres with suspensions of the new dyestuff and submitting them subsequently to heat for a short time, for example at temperatures of from 180° to 210°C.

The new dyestuff provides bright and clear orange dyeings having a good color intensity and showing, besides a very good build-up, very good fastness properties to wetting, sublimation, waste gas and light. When dyeing mixed fabrics of polyester fibres and wool, the new dyestuff provides a good color yield on the polyester part, whereas the woolen part is only faintly dyed. The dyeing of the woolen part may be eliminated well by washing it with emulsifiers or by treatment with reducing agents.

For preparing prints on polyester fibre materials, for example, the new dyestuff may be applied in the form of watercontaining preparations which contain, besides the finely divided dyestuff, suitable thickening agents and agents that assist fixation. Fixation is effected, for example after printing and drying, by steaming at atmospheric pressure during 30 to 60 minutes or under elevated pressure up to 2 atmospheres gauge during 10 to 30 minutes. Fixation may also be obtained by the action of air heated to 180° – 220°C during 30 to 90 seconds.

When dyeing fibrous materials with the new dyestuff from organic solvents or mixtures thereof, two methods are possible: the dyestuff is exhausted on the fibre from the solution (discontinuous dyeing process) at room temperature or above room temperature, preferably at 100° to 130°C, if desired under pressure, or the woven or knitted fabrics from polyester fibres are impregnated with the solution of the new dyestuff and submitted to heat for a short time, for example at temperatures of from 180° to 210°C (continuous dyeing process). These dyeings also show the above-mentioned good fastness properties.

As solvents for the discontinuous process there may be mentioned especially the organic solvents not miscible with water, the boiling points of which range between 40° and 170°C, as for example aromatic hydrocarbons such as toluene, or aliphatic halogenated hydrocarbons such as methylene chloride, trichloroethane, trichloroethylene, perchloroethylene or 1,2,2-trifluorotrichloro-ethane; the mentioned solutions may contain additives such as water, solvents miscible with water and/or other dyeing auxiliaries.

Apart from the mentioned solvents not miscible with water, there may be used for the continuous dyeing process solvents miscible with water, such as alcohols, dimethyl formamide, dimethyl sulfoxide or polyfunctional ethers.

When opposing the new dyestuff to the next comparable one of U.S. Pat. No. 3,081,295, it may be observed that the new compound is much superior to the known dyestuff in many regards as concerns its application. Thus, in order to obtain the same intense dyeings, considerably higher amounts of substance are necessary in the case of the known dyestuff in contradistinction to the dyestuff obtained according to the invention. Furthermore, the dyeings show superior fastness properties; for example, besides a better fastness to light, the dyeings of the dyestuff according to the invention have a better fastness to light, and especially a better fastness to sublimation in comparison to the known dyestuff.

As concerns its constitution, the dyestuff according to the invention is distinguished from the comparative dyestuff prepared according to Example 2 of the mentioned patent by coupling diazotized 2-chloro-4-nitroaniline with N-(β-cyanoethyl)-2-chloroaniline by the fact that the chlorine atom bound to the azo bridge in o-position is replaced by a cyano group.

The following Examples illustrate the invention. Parts and percentages are by weight unless stated otherwise.

EXAMPLE 1

16.3 Parts of 2-cyano-4-nitro-aniline were dissolved at 0° to 15°C in 70 parts of a 98 percent sulfuric acid, and for diazotation the solution was mixed at the same temperature while stirring with 32.4 parts of a 40 percent solution of nitrosyl sulfuric acid. When the reaction was finished, the reaction mixture was added to 300 parts of ice. During 30 minutes, a solution of 18.05 parts of N-(β-cyano-ethyl)-2-chloro-aniline in 90 parts of a 37 percent hydrochloric acid was poured to the diazonium salt solution thus prepared. Stirring was continued for 2 hours at 5° to 20°C. Then the dyestuff obtained in a crystal form was filtered, washed neutral with water and dried.

The new compound which may be called 2'-cyano-4'-nitro-3-chloro-4-(β-cyano-ethylamino)-azobenzene, has the formula (1). It represents a red powder, whose constant melting point amounts to 200°C and whose maximum absorption in the visible part of the light ranges at 472 nm (acetone).

The new dyestuff dyed polyester fabrics from an aqueous dispersion of 120°C under pressure with a clear and intense reddish orange, the dyebath being exhausted to a large extent.

The dyeing had a very good fastness to sublimation, to wetting, to waste gas and to light. Solutions of the new dyestuff in perchloroethylene yield on the polyester fabric dyeings of the same quality.

EXAMPLE 2

A solution of 18.05 of N-(β-cyano-ethyl)-2-chloroaniline in 300 parts by volume of glacial acetic acid was filled up with 100 parts of ice and then, under further addition of 200 parts of ice, completed with a solution of the diazonium salt in a 98 percent sulfuric acid prepared according to Example 1. The addition of ice maintained the reaction temperature at 5°C to 15°C.

About 10 minutes after combining the reactants, the reaction mixture was mixed with 200 parts by volume of an aqueous sodium hydroxide solution (38°Bé); the temperature increased to about 80°C, and the dyestuff was well-crystallized. The whole was diluted with 500 parts by volume of water and stirring was continued for 10 minutes. The pH value of the reaction medium amounted to 4. For isolation the dyestuff was suction-filtered, the filter cake was freed from electrolytes with water and dried.

We claim:
1. The water-insoluble azo-dyestuff of the formula

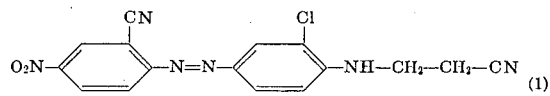

(1)